U S011052499B2

United States Patent
Wang

(10) Patent No.: US 11,052,499 B2
(45) Date of Patent: Jul. 6, 2021

(54) PIPE END CLAMPING APPARATUS

(71) Applicant: Sheng Tsung Wang, Tainan (TW)

(72) Inventor: Sheng Tsung Wang, Tainan (TW)

(73) Assignee: CHIAO SHENG MACHINERY CO., LTD., Tainan (TW)

( * ) Notice: Subject to any disclaimer, the term of this patent is extended or adjusted under 35 U.S.C. 154(b) by 205 days.

(21) Appl. No.: 16/449,776

(22) Filed: Jun. 24, 2019

(65) Prior Publication Data

US 2020/0398391 A1 Dec. 24, 2020

(51) Int. Cl.
*B23Q 3/06* (2006.01)
*B23Q 3/08* (2006.01)

(52) U.S. Cl.
CPC .............. *B23Q 3/064* (2013.01); *B23Q 3/08* (2013.01); *B23Q 2703/06* (2013.01); *B23Q 2703/10* (2013.01)

(58) Field of Classification Search
CPC . B23Q 3/064; B23Q 3/08; B23Q 3/06; B23Q 3/062; B23Q 3/067; B23Q 3/068; B23Q 3/082; B23Q 2703/00; B23Q 2703/02; B23Q 2703/04; B23Q 2703/06; B23Q 2703/10; Y10T 279/1241; Y10T 279/1274; Y10T 279/1283; Y10T 279/1291; B25B 1/20; B25B 5/147; B25B 5/02; B25B 5/06; B25B 5/061
See application file for complete search history.

(56) References Cited

U.S. PATENT DOCUMENTS

| | | | | |
|---|---|---|---|---|
| 2,736,563 A * | 2/1956 | Work | ...................... | B23B 31/30 279/121 |
| 3,926,446 A * | 12/1975 | Rohm | ............... | B23B 31/16254 279/4.12 |
| 6,089,577 A * | 7/2000 | Takada | .............. | B23B 31/16254 279/121 |
| 8,152,174 B2 * | 4/2012 | Kurz | .................... | B23Q 1/0072 279/4.12 |

* cited by examiner

*Primary Examiner* — Tyrone V Hall, Jr.
(74) *Attorney, Agent, or Firm* — Che-Yang Chen; Law Office of Michael Chen

(57) ABSTRACT

A pipe end clamping apparatus includes a first pneumatic cylinder, a second pneumatic cylinder and a clamping component. The first pneumatic cylinder includes a first piston in the first cylinder body, first and second air chambers corresponding to the first and second air inlets respectively, and a first plunger rod installed to the first piston. The second pneumatic cylinder includes a second piston in the second cylinder body, third and fourth air chambers corresponding to the third and fourth air inlets respectively, and, a second plunger rod installed to the second piston. The clamping component has a clamping seat and a clamping component in the housing and pumps air into different air inlets of the first or second pneumatic cylinder to control the first or second piston to displace in the first and second cylinder bodies, so as to control clamping the clamping component or loosening the pipe.

5 Claims, 13 Drawing Sheets

PIPE END CLAMPING APPARATUS

FIELD OF THE INVENTION

The present invention relates to the technical field of a pipe clamping apparatus, and more particularly to the pipe clamping apparatus that clamps a pipe end and operates together with a pipe bender, a pipe cutter, or any other pipe processing machine.

BACKGROUND OF THE INVENTION

In general, a pipe clamping apparatus is mainly installed at a pipe bender, a pipe cutter, and any other pipe processing machine. In FIG. 1, a pipe clamping apparatus 121 is installed to a pipe processing machine 1, and a clamp of the clamping apparatus 121 is provided for clamping a pipe, and a slide rail 13 of a machine 11 is provided for sliding a feeding device 12 to push a pipe to be fed into a processing device 14 in a pipe processing operation. Since the conventional pipe clamping apparatus 121 has a fixture disposed at an outer pipe for clamping an outer wall of the pipe, the outer pipe is driven and moved by a power component, and the fixture is retreated to clamp the outer wall of the pipe, so to push the pipe. However, the conventional clamping apparatus 121 has the drawbacks of turning the clamped portion of the pipe into a scrap easily and requiring a complicated structure.

To overcome the aforementioned drawbacks, the inventor of the present invention filed and obtained R.O.C. Pat. No. 1323198 entitled "Pipe clamping apparatus of a pipe bending machine", wherein an outer pipe is installed at a front end of a base, a pipe support seat is installed at an end of the outer pipe, an inner pipe is installed in the outer pipe and fixed to the base, and a support seat is installed at an end of the inner pipe and configured to be corresponsive to the pipe support seat, so that the base and the inner pipe can be moved and displaced on a wall of the outer pipe to abut the inner wall of the pipe during a pipe bending process by the clamping apparatus, so as to achieve the fixing and pushing effect and increase the usable length of the pipe bending of the pipe, and reducing the waste of materials.

In addition, R.O.C. Pat. No. 584027 discloses a "Pipe end auxiliary pushing device of a pipe bending machine", wherein a moving plate with an adjusting plate and a clamping component of a clampable pipe constitute a pipe moving module, and a moving plate, a first power unit, a second power unit, a fastener and a pushing component constitute an auxiliary pipe pushing module, so that after the clamping component approaches a bending mold seat and a guiding mold seat in a pipe bending operation, the first power unit is provided for controlling the moving plate to stop moving and the second power unit is provided for controlling the moving plate of the pipe moving module to move backward, so that a pipe end is abutted by an abutting component and bent and molded successfully to avoid wasting the pipe end.

R.O.C. Pat. No. 1315227 discloses a "Pipe auxiliary pushing device capable of solving the last feed problem of a pipe bending machine", wherein a pipe clamping unit has a drive pressure cylinder installed at a pipe bending machine and disposed at the same axis of a push lever of a pipe clamping unit, and a first piston of the drive pressure cylinder is provided for driving the push lever to be pushed out in the lengthwise direction, so as to eject the last feed of the pipe to the outside of the clamping unit and overcome the last feed problem of the pipe.

SUMMARY OF THE INVENTION

In view of the drawback of the conventional pipe clamping apparatus that turns the clamped portion of a pipe into a scrap easily and has a complicated structure, it is a primary objective of the present invention to use two pneumatic cylinders to control the vertical and horizontal operations of a clamping component respectively to achieve the effect of simplifying the structure of the clamping apparatus.

To achieve the aforementioned and other objectives, the present invention provides a pipe end clamping apparatus sheathed on an output shaft of a power element and fixed to a fastener of the power element, and the clamping apparatus comprises at least two pneumatic cylinders and a clamping component corresponding to the pneumatic cylinder. The clamping apparatus further comprises: a first cylinder body, having a first accommodating groove formed thereon, a first air inlet and a second air inlet formed on a pipe wall of the first cylinder body; a first piston, accommodated in the first accommodating groove, such that a first air chamber and a second air chamber are formed between the first piston and the first cylinder body and configured to be corresponsive to the first air inlet and the second air inlet respectively, and the first piston having a first plunger rod; a second pneumatic cylinder comprising: a second cylinder body, having a second accommodating groove formed thereon, a third air inlet and a fourth air inlet formed on a pipe wall of the second cylinder body, and a penetrating hole formed in the second accommodating groove for passing the first plunger rod; and a second piston, accommodated in the second accommodating groove, such that a third air chamber and a fourth air chamber are formed between the second piston and the second cylinder body and configured to be corresponsive to the third air inlet and the fourth air inlet respectively, and the second piston having a second plunger rod, and a penetrating hole formed on the second piston for passing the first plunger rod. The clamping component comprises: a housing, having an accommodating groove formed thereon, and a through hole formed on the accommodating groove for passing the first plunger rod and the second plunger rod, and a plurality of tabs disposed in the accommodating groove for locking the first plunger rod or the second plunger rod and formed in a rail slot; a clamping seat, accommodated in the accommodating groove, and having a through hole formed on the clamping seat for passing the first plunger rod and the second plunger rod, and forming a plurality of chutes; and a plurality of clamping components, accommodated in the chute, and having a slide rail disposed on the clamping component and embedded into the rail slot, and a chuck disposed at an end of the clamping component.

Based on the description above, the pipe clamping apparatus pumps air into different air inlets of the first pneumatic cylinder or the second pneumatic cylinder to control the first piston or the second piston to displace in the first cylinder body and the second cylinder body, so as to control clamping the clamping component or loosening the pipe, and improve the convenience of operating and controlling the pipe clamping apparatus.

It is noteworthy that the clamping apparatus includes three or more pneumatic cylinders, and the plunger rod of the third pneumatic cylinder piston is staggered with respect to the first and second plunger rods of the first and second pneumatic cylinders, and the accommodating groove of the cylinder body of the second pneumatic cylinder has a penetrating hole formed thereon for passing the first and the second plunger rods, so that the clamping apparatus can add a clamping component by adding a pneumatic cylinder, and this arrangement allows the clamping apparatus to cope with various different pipe clamping requirements.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
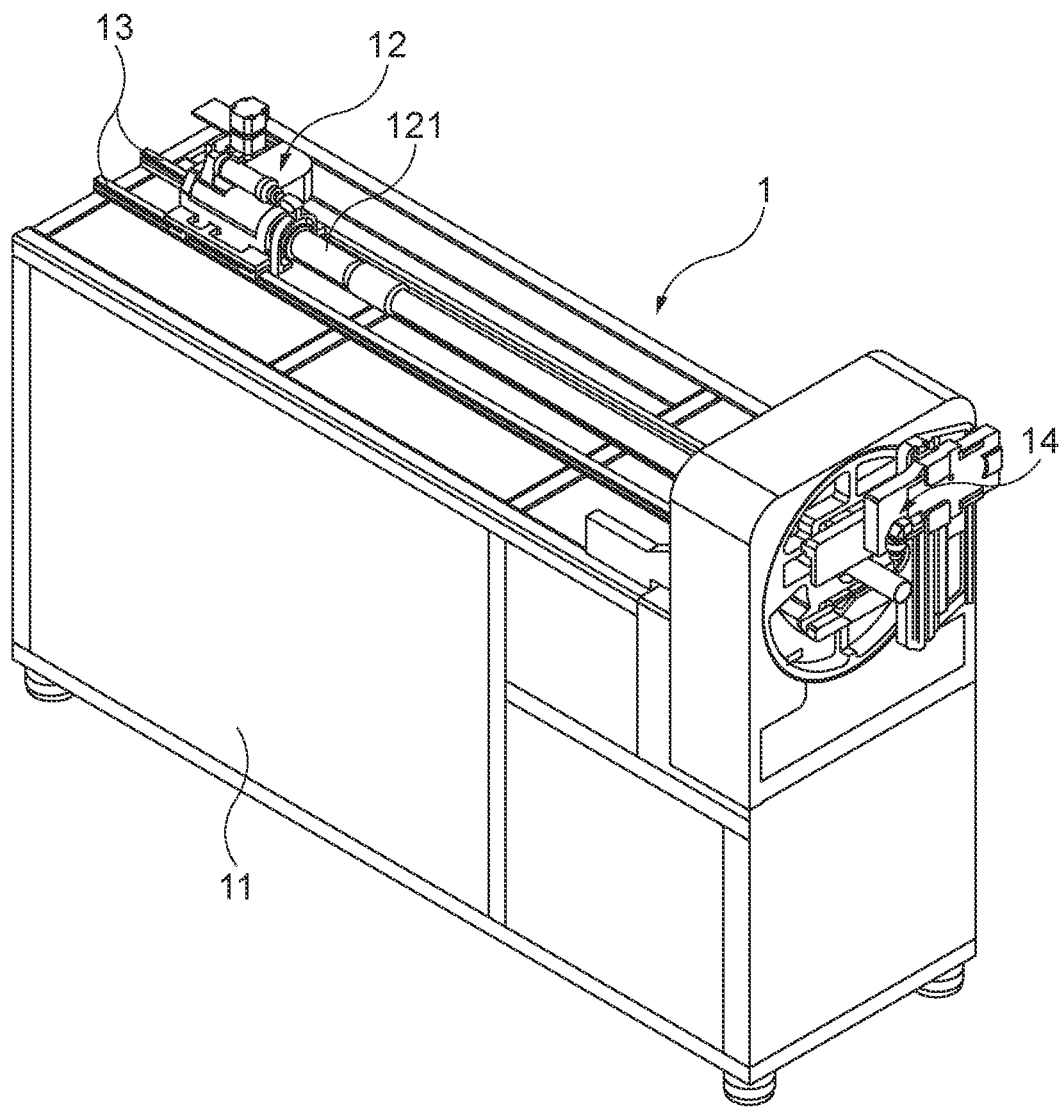
FIG. 1 is a schematic view of a conventional clamping apparatus used in a pipe processing machine.
Figure 2:
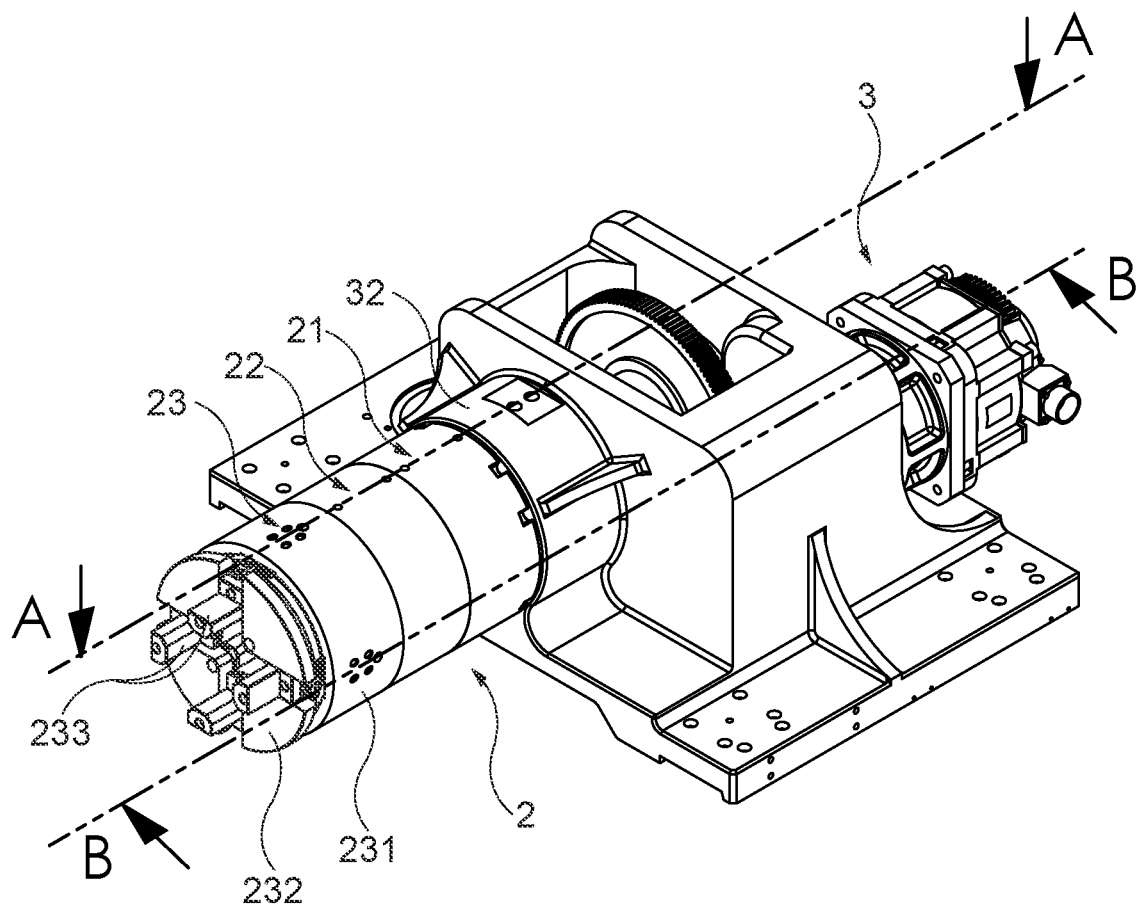
FIG. 2 is a perspective view of the present invention.
Figure 3:
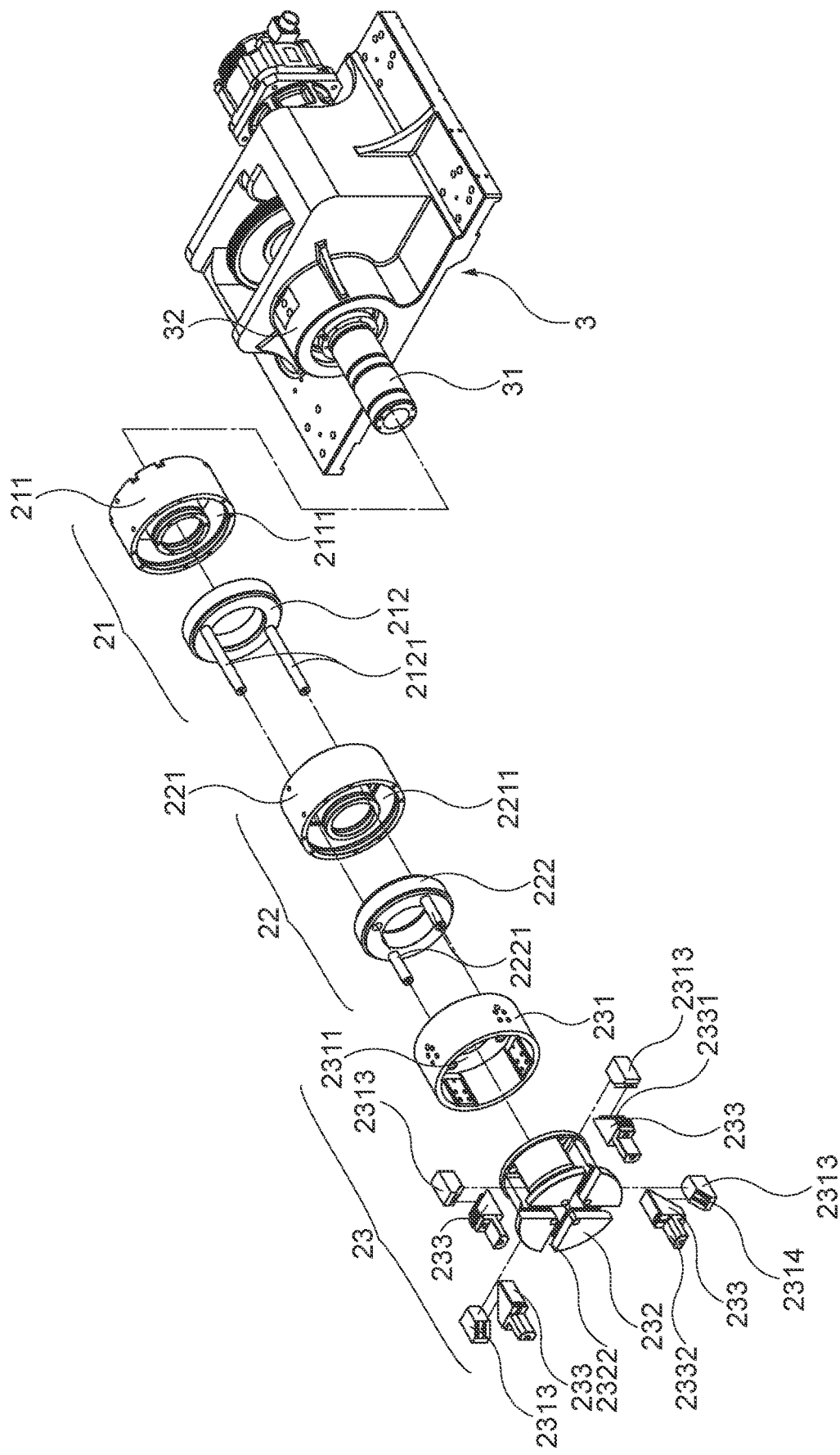
FIG. 3 is an exploded view of the present invention.
Figure 4:
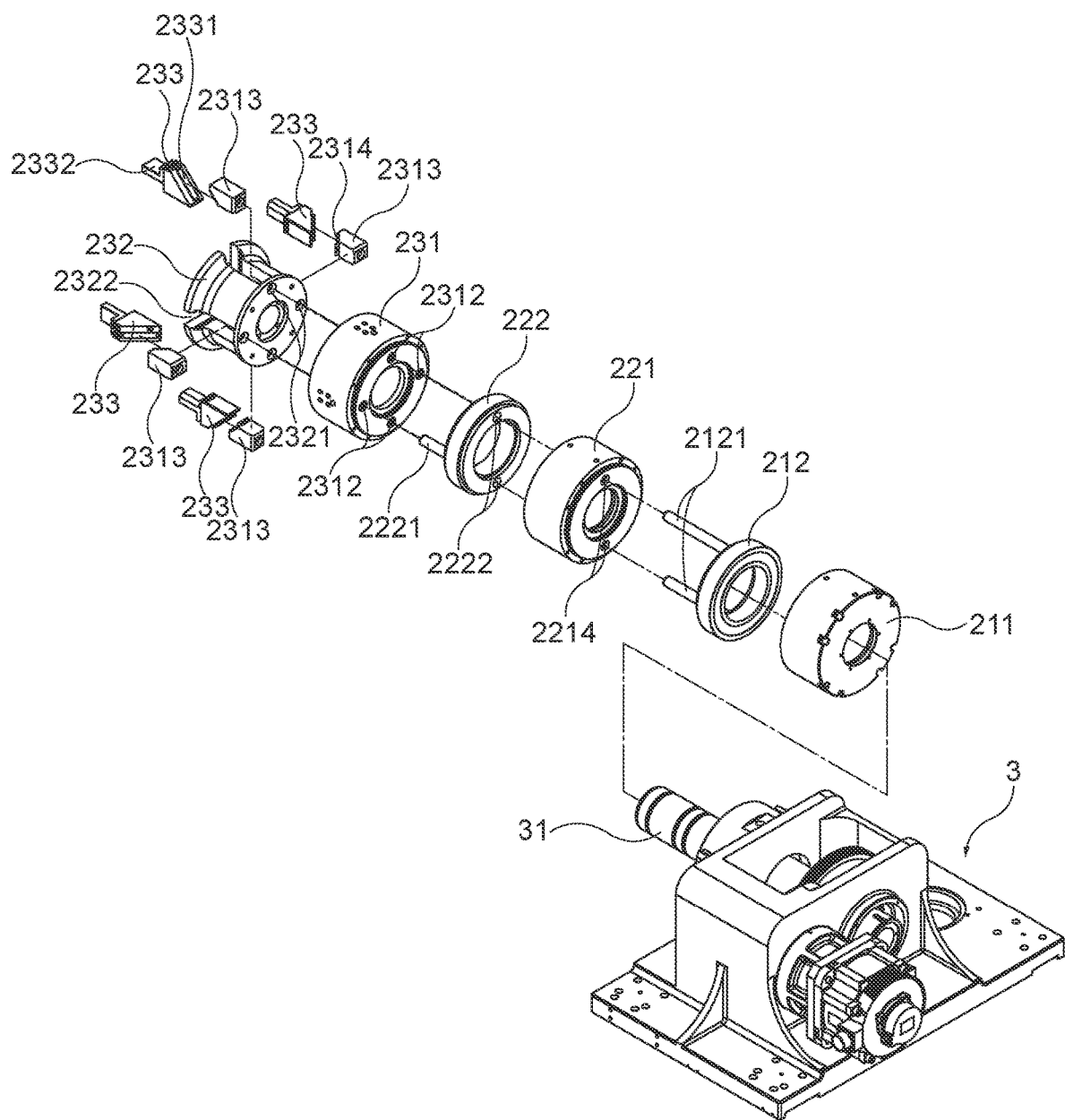
FIG. 4 is another exploded view of the present invention.
Figure 5:
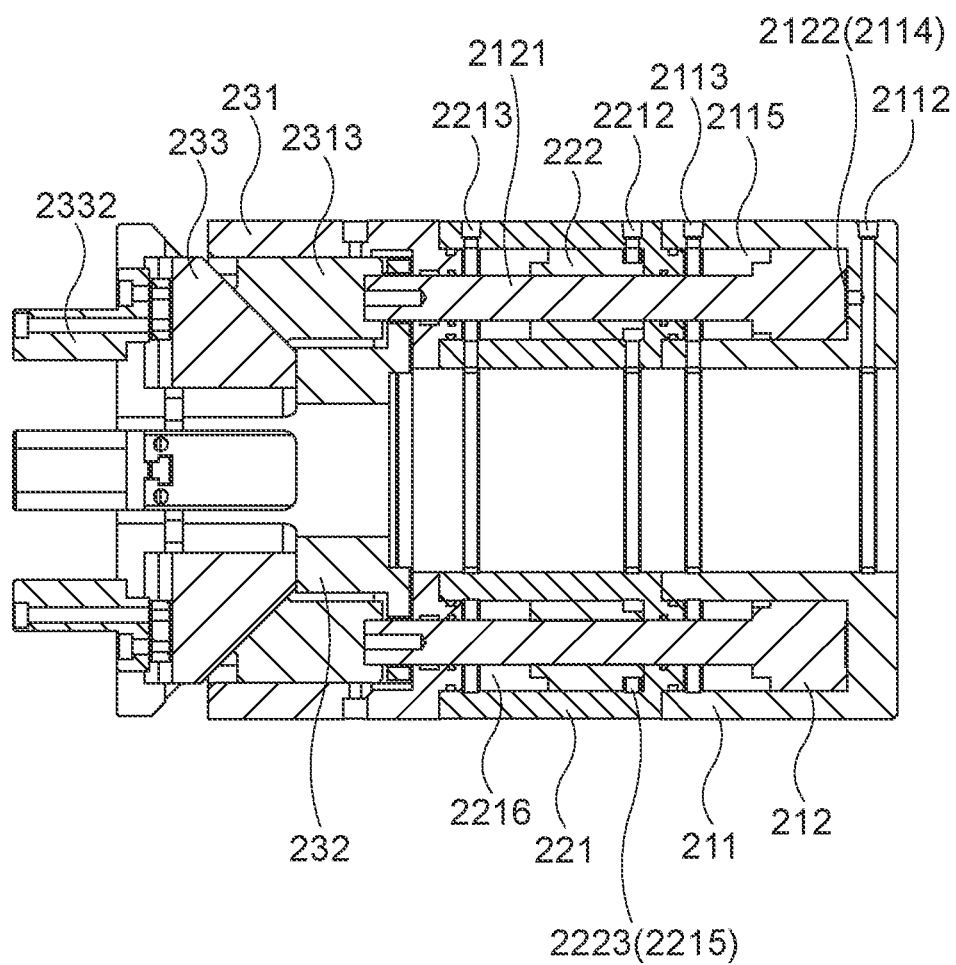
FIG. 5 is a cross-sectional view of Section A-A of FIG. 2 of the present invention.
Figure 6:
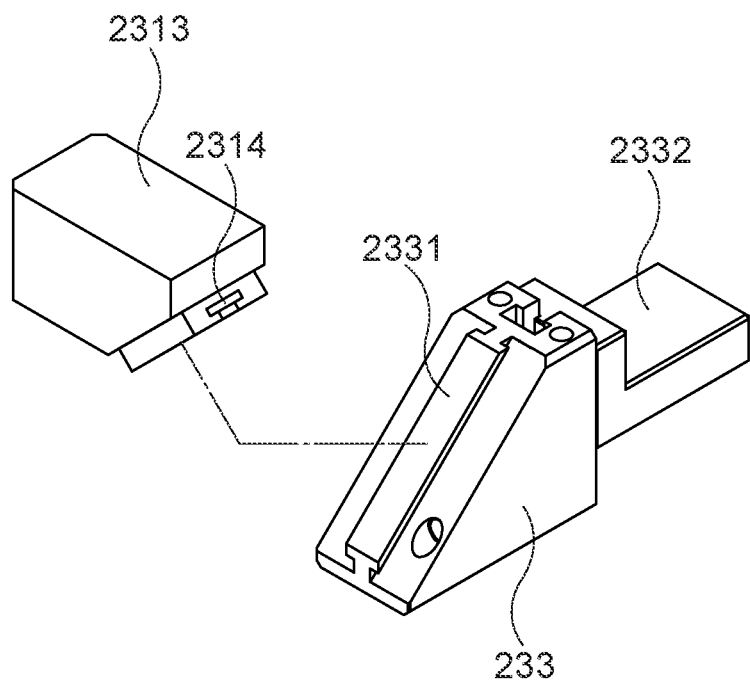
FIG. 6 is an exploded view of a clamping component of the present invention.

With reference to FIGS. 2-4 for a clamping apparatus of the present invention, the clamping apparatus 2 is sheathed on an output shaft 31 of a power element 3 and fixed to a fastener 32 of the power element 3, and the clamping apparatus 2 comprises at least two pneumatic cylinders and a clamping component corresponding to the pneumatic cylinder. In an embodiment of the present invention, the clamping apparatus 2 comprises a first pneumatic cylinder 21, a second pneumatic cylinder 22 and a clamping component 23. Wherein, the first pneumatic cylinder 21 comprises a first cylinder body 211 and a first piston 212. The first cylinder body 211 has a first accommodating groove 2111 formed thereon, and a first air inlet 2112 and a second air inlet 2113 formed on a pipe wall of the first cylinder body 211 (refer to FIG. 5). The first piston 212 is accommodated in the first accommodating groove 2111, so that a first air chamber 2114 and a second air chamber 2115 are formed between the first piston 212 and the first cylinder body 211 and configured to be corresponsive to the first air inlet 2112 and the second air inlet 2113 respectively, and the first air chamber 2114 is formed by a ring groove 2122 at the bottom of the first piston 212 and communicated with the first air inlet 2112, and two first plunger rods 2121 are installed vertically at the first piston 212. The second pneumatic cylinder 22 comprises a second cylinder body 221 and a second piston 222. The second cylinder body 221 has a second accommodating groove 2211 formed therein, a third air inlet 2212 and a fourth air inlet 2213 formed on a pipe wall of the second cylinder body 221, and a penetrating hole 2214 formed on the second accommodating groove 2211 for passing the first plunger rod 2121. The second piston 222 is accommodated in the second accommodating groove 2211, such that a third air chamber 2215 and a fourth air chamber 2216 are formed between the second piston 222 and the second cylinder body 221 and configured to be corresponsive to the third air inlet 2212 and the fourth air inlet 2213, wherein the third air chamber 2215 is formed by a ring groove 2223 on a peripheral surface of the second piston 222 and configured to be corresponsive to the third air inlet 2212, and two second plunger rods 2221 are installed horizontally at the second piston 222, such that the first plunger rod 2121 and the second plunger rod 2221 are staggered, and a penetrating hole 2222 is formed on the second piston 222 for passing the first plunger rod 2121. The clamping component 23 comprises a housing 231, a clamping seat 232 and a plurality of clamping components 233, and the housing 231 has an accommodating groove 2311 formed therein, a through hole 2312 formed on the accommodating groove 2311 for passing the first plunger rod 2121 and the second plunger rod 2221, a plurality of tabs 2313 disposed in the accommodating groove 2311 and locked to the first plunger rod 2121 or the second plunger rod 2221, and a rail slot 2314 formed on the tab 2313. The clamping seat 232 is accommodated in the accommodating groove 2311, and the clamping seat 232 has a through hole 2321 formed thereon for passing the first plunger rod 2121 and the second plunger rod 2221, and a plurality of chutes 2322 is formed. The clamping component 233 is accommodated in the chute 2322, and the clamping component 233 has a slide rail 2331 of a rail slot 2314 for embedding the corresponding tab 2313, and a chuck 2332 is disposed at an end of the clamping component 233. In an embodiment of the present invention, the slide rail 2331 of the clamping component 233 and the rail slot 2314 of the tab 2313 have an included angle of 45 degrees defined at a junction thereof (as shown in FIG. 6), so that the stroke of the first piston 212 or the second piston 222 is the same as the stroke of the tab 2313 of the clamping component 23.

Figure 7:
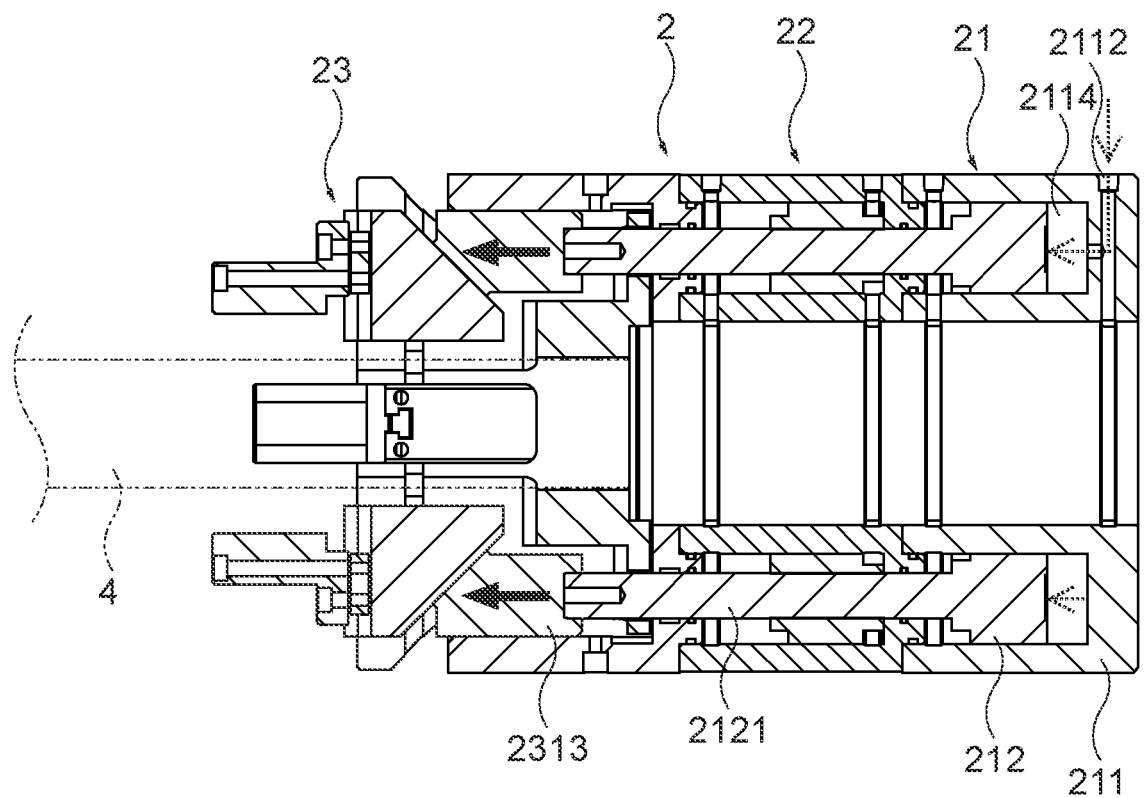
FIGS. 7-9 are cross-sectional views of Section A-A that clamps a pipe in accordance with the present invention pipe.
Figure 8:
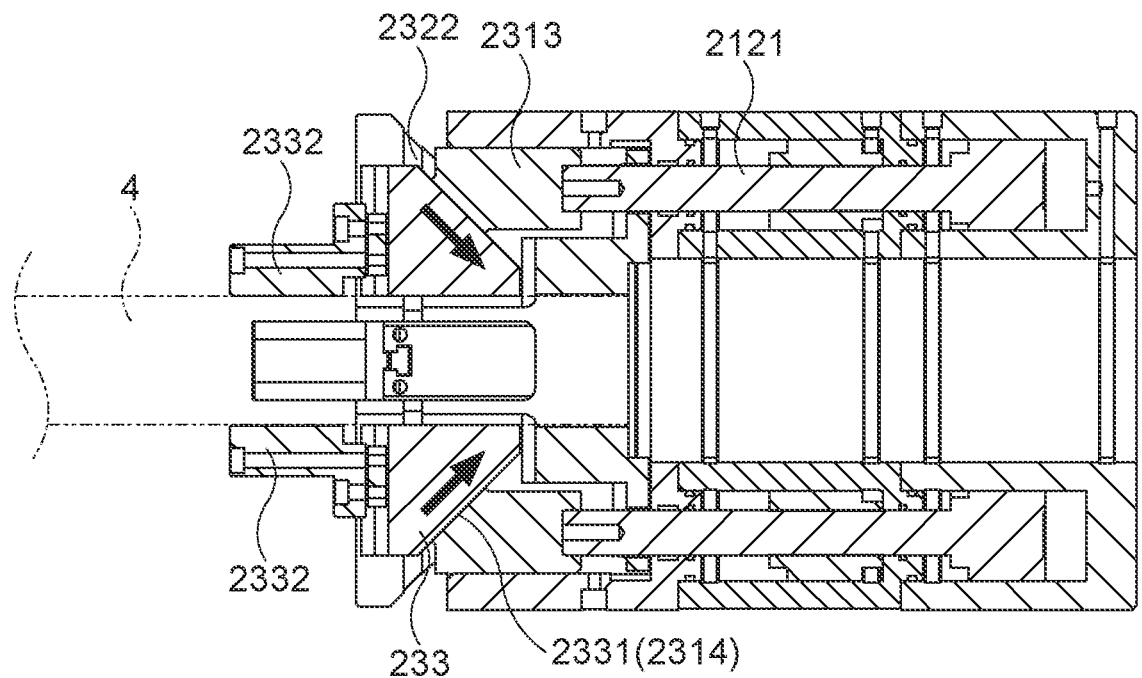
Figure 9:
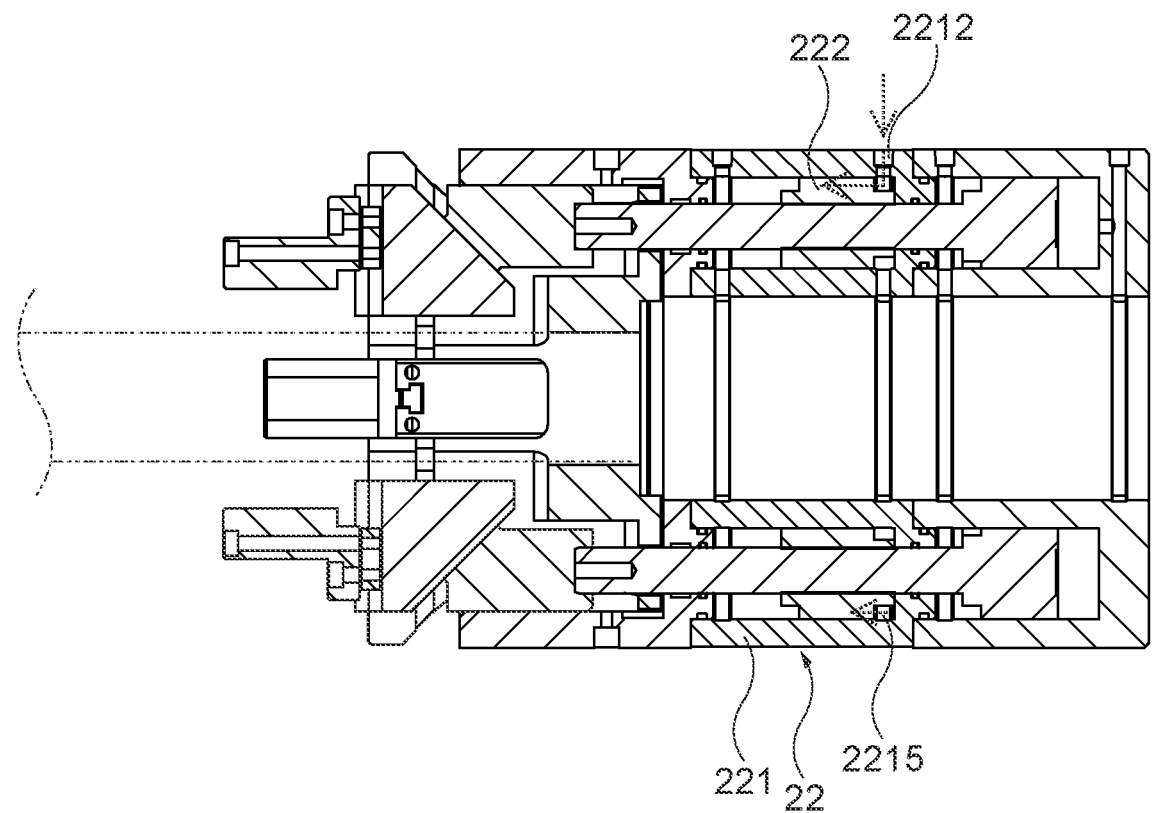
Figure 10:
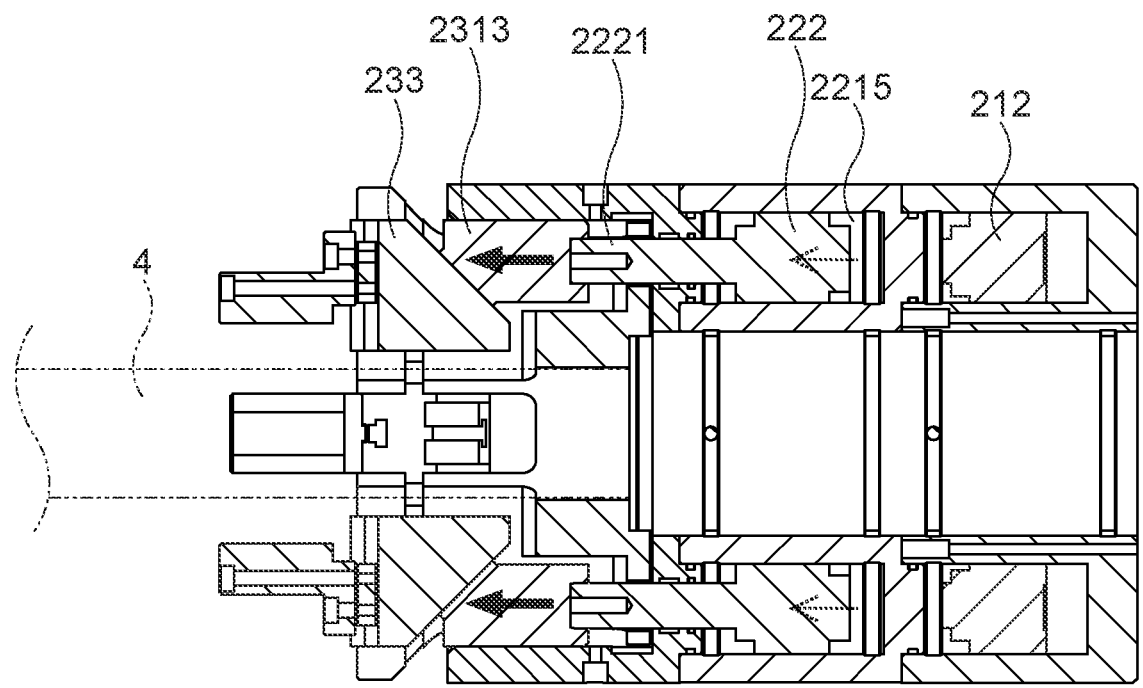
FIGS. 10-11 are cross-sectional views of Section B-B of FIG. 2 that clamps a pipe in accordance the present invention pipe.
Figure 11:
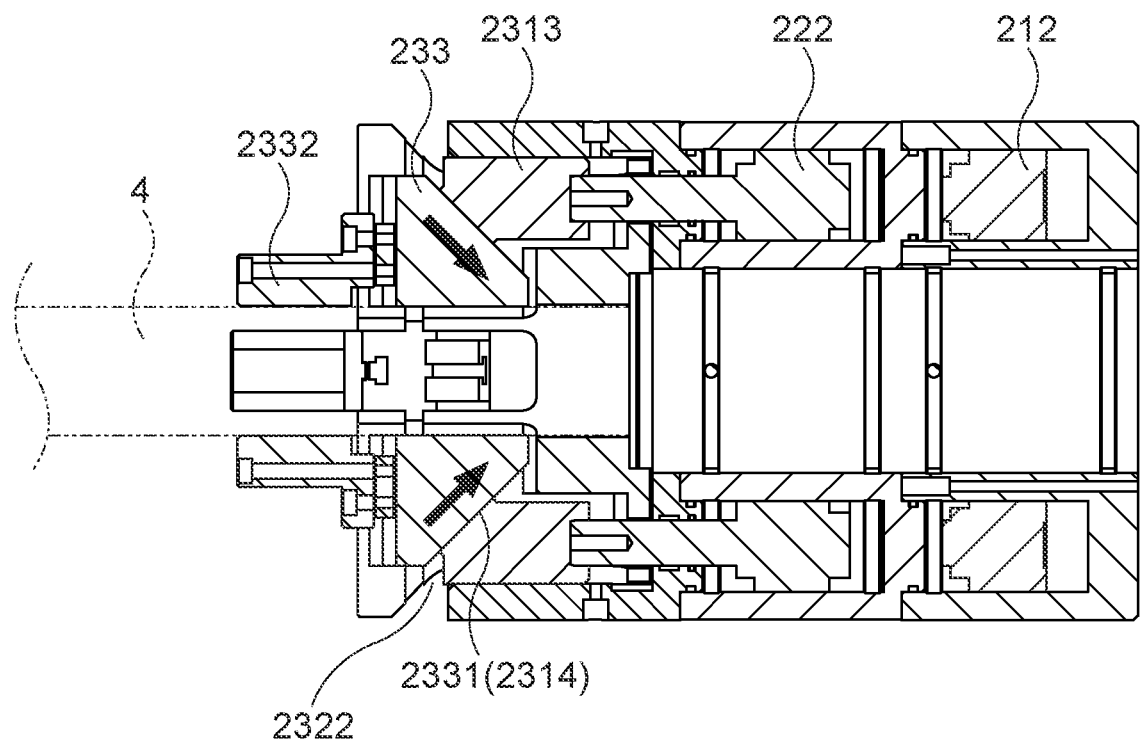

In FIG. 7, when it is necessary to use the pipe clamping apparatus 2 to clamp a pipe 4, air is mainly used to drive the first pneumatic cylinder 21 and the second pneumatic cylinder 22 to operate the clamping component 23. Air is pumped from the first air inlet 2112 of the first cylinder body 211 of the first pneumatic cylinder 21 into the first air chamber 2114 to push a first piston 212 (in a direction indicated by the arrowhead in FIG. 7), so that the tab 2313 is pushed out by the first plunger rod 2121, and the clamping component 233 is pushed out of the chute 2322 to slide down with an angle along the rail slot 2314 of the tab 2313 through the slide rail 2331 (as shown in FIG. 8), and the chuck 2332 of the clamping component 233 is clamped at the pipe 4. Similarly, the second pneumatic cylinder 22 also pumps air from the third air inlet 2212 of the second cylinder body 221 (as shown in FIG. 9), so that air enters into the third air chamber 2215 to push the second piston 222 (in a direction indicated by the arrowhead in FIG. 9), so that the tab 2313 is pushed out by the second plunger rod 2221, and the clamping component 233 is pushed out from the chute 2322 to slide down with an angle along the rail slot 2314 of the tab 2313 through the slide rail 2331 (as shown in FIG. 11), and the chuck 2332 of the clamping component 233 is clamped at the pipe 4 to complete the clamping of the pipe 4.

Figure 12:
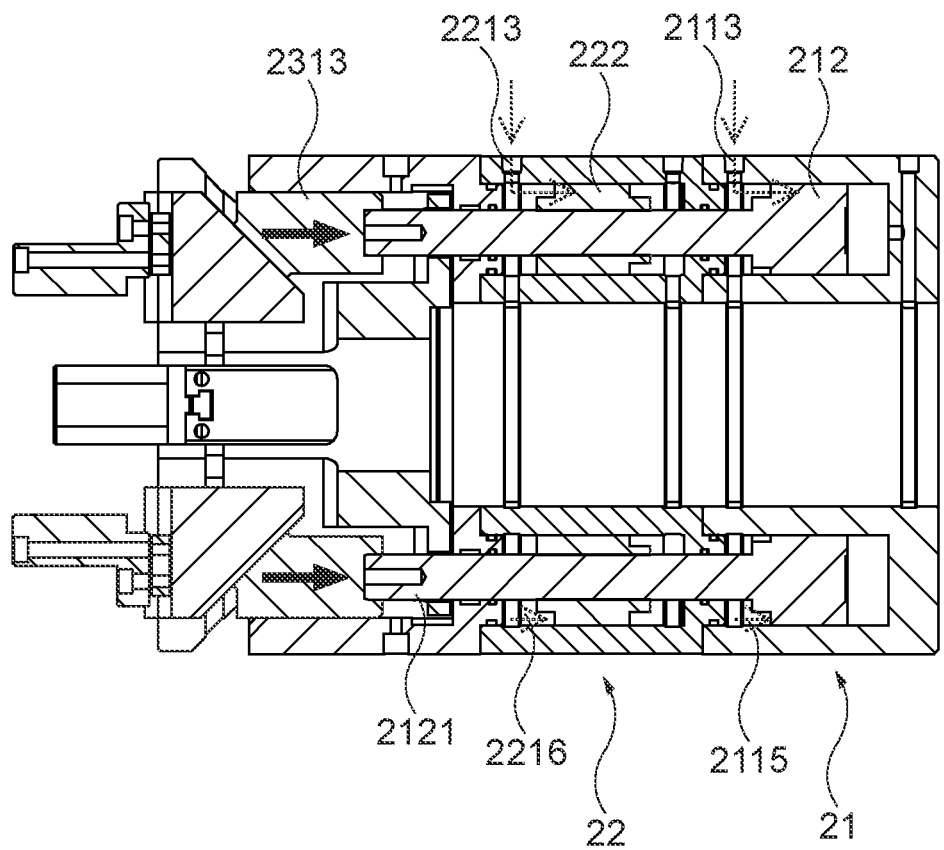
FIG. 12 is a cross-sectional view of Section A-A that releases a pipe in accordance with the present invention.
Figure 13:
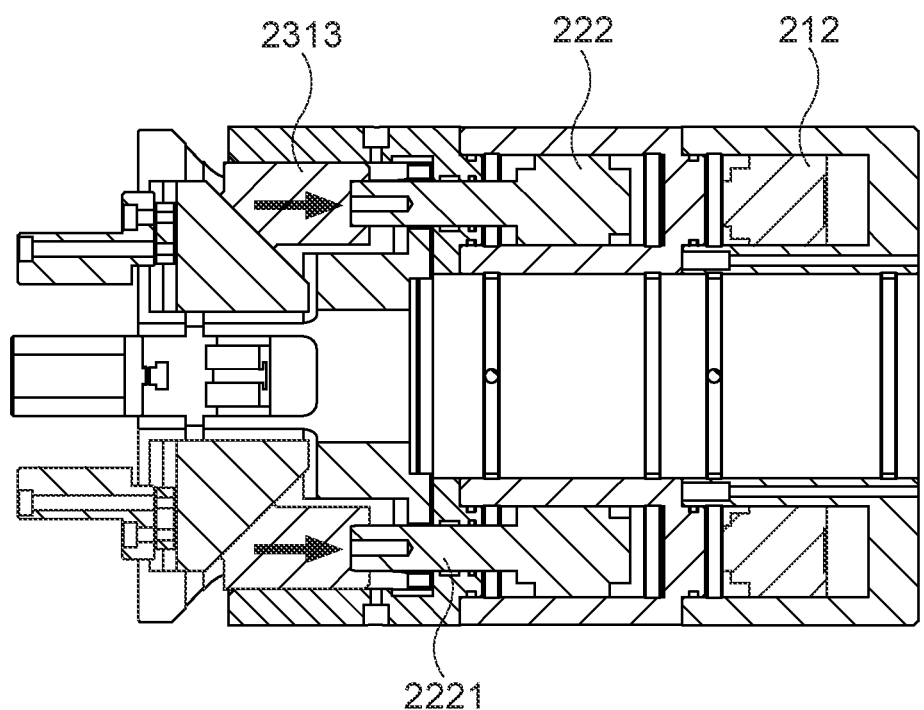
FIG. 13 is a cross-sectional view of Section A-A which releases a pipe in accordance with the present invention.

In FIGS. 12-13, after the pipe 4 is bent, cut or processed with other processes, air is pumped from the second air inlet 2113 of the first pneumatic cylinder 21 and the fourth air inlet 2213 of the second pneumatic cylinder 22, so that the air enters into the second air chamber 2115 and the fourth air chamber 2216 separately to push the first piston 212 and the second piston 222 (in a direction indicated by the arrowhead in FIG. 12), so as to lock the clamping component 233 of the first plunger rod 2121 and the second plunger rod 2221 securely and complete the position restoration.

Therefore, the pipe clamping apparatus 2 of present invention can pump air into different air inlets to push the first piston 212 or the second piston 222 to displace, so as to control the clamping component 233 to clamp or loosen the pipe 4, and improve the convenience of the operation and control of the pipe clamping apparatus 2.

What is claimed is:

1. A pipe end clamping apparatus, sheathed on an output shaft of a power element, and fixed to a fastener of the power element, and the clamping apparatus comprising at least two pneumatic cylinders and a clamping component corresponding to the pneumatic cylinder, and the clamping apparatus further comprising:
   a first pneumatic cylinder, comprising:
      a first cylinder body, having a first accommodating groove formed thereon, a first air inlet and a second air inlet formed on a pipe wall of the first cylinder body; and
      a first piston, accommodated in the first accommodating groove, such that a first air chamber and a second air chamber are formed between the first piston and the first cylinder body and configured to be corresponsive to the first air inlet and the second air inlet respectively, and the first piston having a first plunger rod;
   a second pneumatic cylinder, comprising:
      a second cylinder body, having a second accommodating groove formed thereon, a third air inlet and a fourth air inlet formed on a pipe wall of the second cylinder body, and a penetrating hole formed in the second accommodating groove for passing the first plunger rod; and
      a second piston, accommodated in the second accommodating groove, such that a third air chamber and a fourth air chamber are formed between the second piston and the second cylinder body and configured to be corresponsive to the third air inlet and the fourth air inlet respectively, and the second piston having a second plunger rod, and a penetrating hole formed on the second piston for passing the first plunger rod; and
   the clamping component comprising:
      a housing, having an accommodating groove formed thereon, and a through hole formed on the accommodating groove for passing the first plunger rod and the second plunger rod, and a plurality of tabs disposed in the accommodating groove for locking the first plunger rod or the second plunger rod and formed in a rail slot;
      a clamping seat, accommodated in the accommodating groove, and having a through hole formed on the clamping seat for passing the first plunger rod and the second plunger rod, and forming a plurality of chutes; and
      a plurality of clamping components, accommodated in the chute, and having a slide rail disposed on the clamping component and embedded into the rail slot, and a chuck disposed at an end of the clamping component.

2. The pipe end clamping apparatus according to claim 1, wherein the first piston has a ring groove formed at the bottom of the first piston and communicated to the first air inlet to constitute the first air chamber.

3. The pipe end clamping apparatus according to claim 1, wherein the second piston has a ring groove formed thereon and configured to be corresponsive to the peripheral surface of the third air inlet to constitute the third air chamber.

4. The pipe end clamping apparatus according to claim 1, wherein the first plunger rod of the first piston is installed in a vertical direction, and the second plunger rod of the second piston is installed in a horizontal direction, so that the first plunger rod and the second plunger rod are staggered.

5. The pipe end clamping apparatus according to claim 1, wherein the slide rail and the rail slot have an included angle of 45 degrees defined at the junction thereof.

* * * * *